A. B. DAVIS.
Water-Elevator.
No. 207,799.  Patented Sept. 10, 1878.
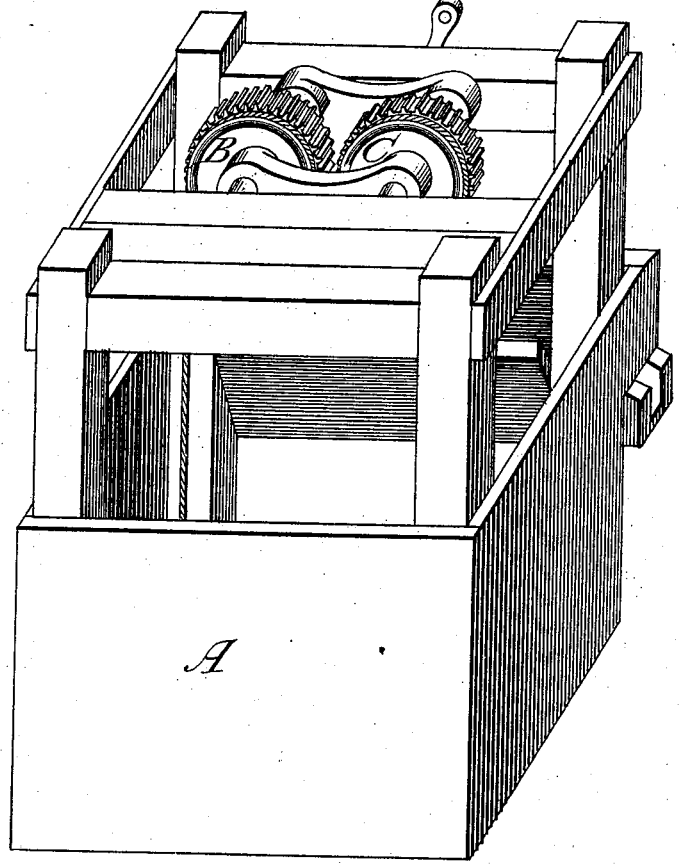
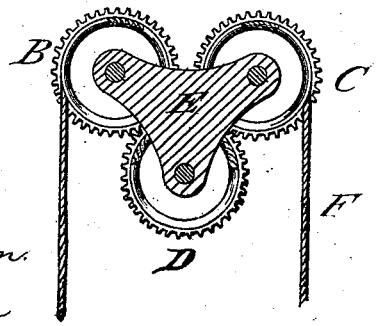
Attest:
Saml. C. Hodgman.
Malcolm Winne
Inventor
Ansel B Davis

UNITED STATES PATENT OFFICE.

ANSEL B. DAVIS, OF MAYFIELD, MICHIGAN.

IMPROVEMENT IN WATER-ELEVATORS.

Specification forming part of Letters Patent No. 207,799, dated September 10, 1878; application filed December 29, 1877.

*To all whom it may concern:*

Be it known that I, ANSEL B. DAVIS, of Mayfield, in the county of Grand Traverse and State of Michigan, have invented a new and useful Improvement in Water-Elevators, which improvement is fully set forth in the following specification and accompanying drawings, in which—

Figure 1 is a perspective view, and Fig. 2 is an end view, of the arrangement of pulleys and gearing in which my improvement mainly consists.

A represents the frame-work or curb. B and C represent two grooved wheels or pulleys; D, a third wheel or pulley gearing into the pulleys B and C, and to which is attached a crank, G, or other equivalent device, for giving motion to the pulleys. F represents the rope or flexible band to which the buckets (not shown) are attached. The rope F passes under and nearly around the pulley D, thence over and around the pulleys B and C, as shown in Fig. 2.

By turning the crank G forward one bucket is elevated, and by any suitable tripping arrangement the water or other material is poured into a spout to convey it outside of the curb. By turning the crank in a reverse direction the other bucket is elevated and emptied in a like manner.

I am aware that elevators have been made with three wheels or pulleys in a somewhat similar position to mine, but not geared together; also, that various forms of bucket have been made, some emptying through a valve in the bottom, others by tipping to one side, none of which forms I claim.

The particular advantages gained by my invention are these: By gearing the pulleys together a much larger frictional surface is available to hold the rope from slipping than when the available friction is derived from the central pulley alone, and the whole friction of the three pulleys combined is at any time employed in resisting the tendency of the rope to slip in the direction of the strain at that time. It is also adapted for the use of any kind of bucket that may be desired.

The object of my invention is to furnish an inexpensive and durable water-elevator, easy to operate, and not liable to get out of repair.

Having thus described my invention, what I claim as new, and desire to secure by Letters Patent, is—

The arrangement, in a water-elevator, of the three grooved wheels or pulleys B C D, connected together and revolving simultaneously by means of gearing upon their periphery, and operating in connection with the rope F, substantially as and for the purpose set forth.

ANSEL B. DAVIS.

Witnesses:
 SAML. C. HODGMAN,
 MALCOLM WINNE.